Deniston, Prosser, & Deniston,
Cider Press.

No. 93,861. Patented Aug. 17, 1869.

PLAN.

Witnesses
Charles A. McLean
Horace Prosser

Theodore F. Deniston
George C. Prosser
Johnston J. Deniston

United States Patent Office.

THEODORE F. DENISTON, GEORGE C. PROSSER, AND JOHNSON J. DENISTON, OF TORREY, NEW YORK.

Letters Patent No. 93,861, dated August 17, 1869.

CIDER AND WINE-MILL.

The Schedule referred to in these Letters Patent and making part of the same.

*To all whom it may concern:*

Be it known that we, THEODORE F. DENISTON, GEORGE C. PROSSER, and JOHNSON J. DENISTON, of the town of Torrey, in the county of Yates, and State of New York, have invented a new and useful Cider-Mill and Press; and to enable others skilled in the art to make and use our invention, we hereby declare that the following is a full, clear, and exact description of the construction and operation of the same, reference being had to the annexed drawings, making a part of this specification, and to the letters of reference marked thereon.

The nature of our invention consists in the construction and arrangement of parts which will be hereafter more fully described.

Figure 1:
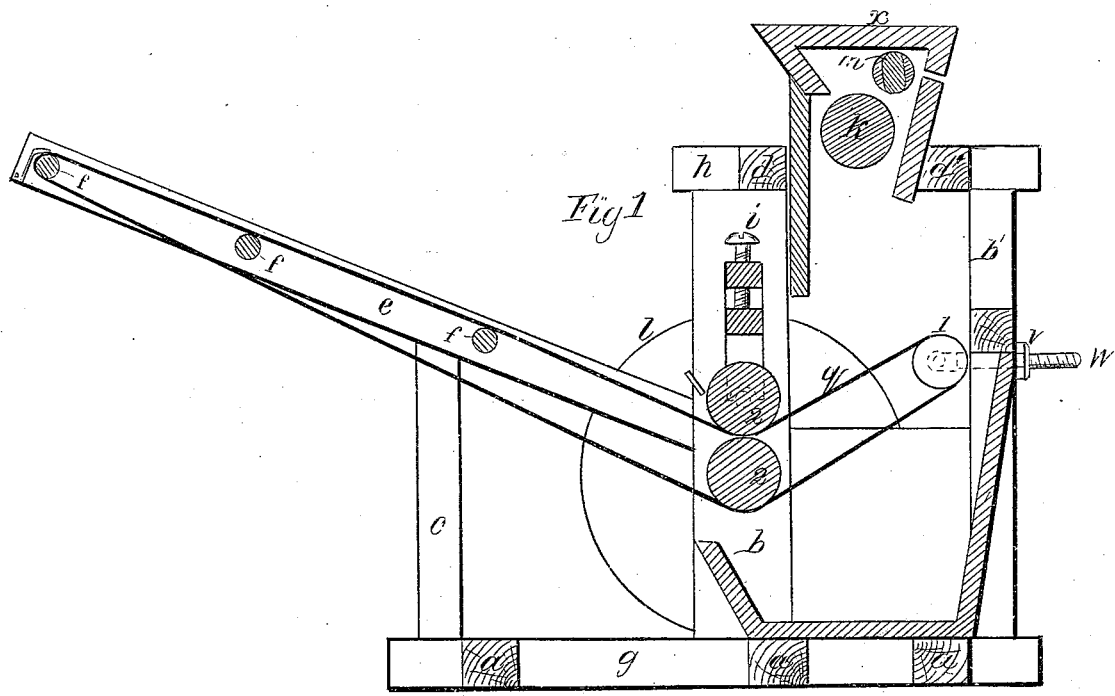
Figure 1 is a side sectional view of our invention.

We construct of wood, a frame, of any desirable size, in the ordinary manner, having for its base the platform composed of horizontal beams $g$, with cross-pieces $a\ a\ a$, and attached to this are perpendicular supporting-beams $c\ b\ b$, as shown in the accompanying drawings, fig. 1, which compose the frame-work of our machine.

Figure 2:
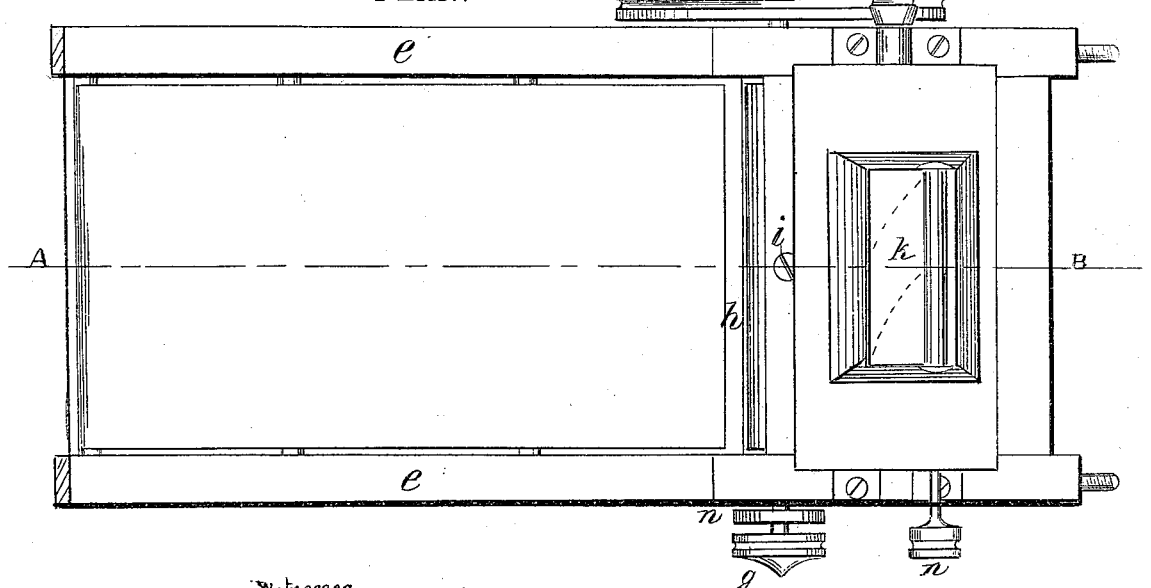
Figure 2 is a plan or top view of the same, reference being had to the letters of reference marked thereon.

We construct at an angle of about forty-five degrees, two projecting pieces, $e\ e$, fig. 2, in which work three or more rollers, $f\ f\ f$.

Above the supporting-beams $b\ b$, we arrange a hopper, $x$, of any convenient size, supported by cross-pieces $d$, $d'$, and $a$.

This receptacle or hopper is open at the top for the admission of fruits, &c.

Working in the lower part of said hopper is a revolving cylinder, $k$, with teeth inserted on its periphery, and diagonal to this is a revolving feeder, $m$, which is operated by means of a band from the driving and pulley-wheels $l\ g\ n$.

Between the upright supporting-beams $b$, we affix two rollers, 2 2, the lower one made to revolve by means of the driving-wheel and pulleys before mentioned.

Upon the opposite end of said roller, working outside of the opposite beams $b$, we affix or attach a pulley, with cog-wheel $n$, as seen in fig. 2.

Directly above the stationary pressure-roller we arrange a roller of similar construction, said roller being adjustable by means of the journal and screw-gauge $i$.

We construct, a little above a line parallel to the centre of the axis of the upper roller, a primary roller, 2, working in supports, and adjusted either near or away from the rollers by the screw $w$ and nut $v$, which regulates the apron.

We will now explain the use and operation of our machine.

When the driving-wheel 2 is turned by means of the pulley $g$ and $n$, and bands operating, apples, grapes, or other fruits are then thrown into the hopper $i$, and as the toothed cylinder $k$ is turned, the fruit is forced between the side of the hopper by the feeding-roller and the crushing-cylinder $k$.

The fruit is then reduced to pomace, and falls upon the receiving apron, and is forced between the pressure-rollers 2 2. The juice expressed runs down into a box or any convenient receptacle placed to receive it.

After the pomace has passed between the rollers, it is carried by the apron over the rollers $f\ f\ f$ to the end of the machine, and then drops upon the ground, or if desired, into a convenient receptacle placed to receive it.

What we claim, and desire to secure by Letters Patent, is—

The cider and wine-mill herein described, consisting of the frame $a\ b\ c\ d\ e$, hopper $x$, with its feeder $m$, and grinding-cylinder $k$, endless apron $q$, crushing-rollers 2 2, the upper one having a bearing adjustable by set-screw $i$, and pulley 1, adjusted by nut and screw $v\ w$, all constructed, arranged, and operated as and for the purposes herein set forth.

THEODORE F. DENISTON.
GEORGE C. PROSSER.
JOHNSON J. DENISTON.

Witnesses:
CHARLES A. McLEAN,
H. PROSSER.